United States Patent
Teraya

(10) Patent No.: US 8,991,338 B2
(45) Date of Patent: Mar. 31, 2015

(54) VEHICLE AND METHOD FOR CONTROLLING THE SAME

(75) Inventor: Ryuta Teraya, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/881,550

(22) PCT Filed: Dec. 24, 2010

(86) PCT No.: PCT/JP2010/073330
§ 371 (c)(1),
(2), (4) Date: Apr. 25, 2013

(87) PCT Pub. No.: WO2012/086056
PCT Pub. Date: Jun. 28, 2012

(65) Prior Publication Data
US 2013/0255600 A1    Oct. 3, 2013

(51) Int. Cl.
| F01P 7/00 | (2006.01) |
| F01P 11/16 | (2006.01) |
| B60K 6/445 | (2007.10) |
| B60W 10/06 | (2006.01) |
| B60W 10/30 | (2006.01) |
| B60W 20/00 | (2006.01) |
| F02D 29/02 | (2006.01) |

(Continued)

(52) U.S. Cl.
CPC ................. *F01P 11/16* (2013.01); *B60K 6/445* (2013.01); *B60W 10/06* (2013.01); *B60W 10/30* (2013.01); *B60W 20/00* (2013.01); *B60W 2510/0676* (2013.01); *B60W 2710/0688* (2013.01); *F02D 29/02* (2013.01); *F02N 11/0818* (2013.01); *F02N 2200/023* (2013.01); *Y02T 10/48* (2013.01); *F02N 11/04* (2013.01); *F02N 2011/0888* (2013.01); *F01P 7/164* (2013.01); *F01P 2025/30* (2013.01)
USPC ...................... 123/41.02; 123/41.05; 701/110

(58) Field of Classification Search
CPC ..... F01P 7/164; F01P 2031/30; F01P 2037/00
USPC ................. 123/41.02, 41.05, 41.01; 165/148; 701/2, 112
See application file for complete search history.

(56) References Cited

U.S. PATENT DOCUMENTS 8,596,228 B2 * 12/2013 Kinomura ..................... 123/41.1
2002/0035971 A1 * 3/2002 Suzuki et al. ................ 123/41.1
(Continued)

FOREIGN PATENT DOCUMENTS

JP    A-2002-211238    7/2002
JP    A-2004-204740    7/2004
(Continued)

*Primary Examiner* — Noah Kamen
*Assistant Examiner* — Long T Tran
(74) *Attorney, Agent, or Firm* — Oliff PLC

(57) ABSTRACT

A vehicle includes an engine capable of being intermittently stopped after it is started; a water pump for circulating cooling water, and an ECU. When the cooling water has low temperature the ECU controls the water pump to limit the flow rate of the cooling water to be smaller than when the cooling water has high temperature. When the cooling water has a limited flow rate the ECU sets lower a threshold value of the cooling water's temperature for permitting intermittently stopping the engine than when the cooling water does not have a limited flow rate. When the cooling water has a limited flow rate the engine can nonetheless be intermittently stopped at an appropriate time.

21 Claims, 5 Drawing Sheets

(51) Int. Cl.
*F02N 11/08* (2006.01)
*F01P 7/16* (2006.01)
*F02N 11/04* (2006.01)

(56) References Cited

U.S. PATENT DOCUMENTS

| | | | |
|---|---|---|---|
| 2008/0185925 A1* | 8/2008 | Kurple | 310/54 |
| 2009/0198438 A1 | 8/2009 | Jinno | |
| 2009/0205588 A1* | 8/2009 | Bilezikjian et al. | 123/41.02 |
| 2009/0229543 A1* | 9/2009 | Suzuki | 123/41.02 |
| 2010/0083916 A1* | 4/2010 | Shintani et al. | 123/41.1 |
| 2011/0214627 A1* | 9/2011 | Nishikawa et al. | 123/41.02 |
| 2012/0132154 A1* | 5/2012 | Suzuki et al. | 123/41.02 |
| 2012/0199084 A1* | 8/2012 | Kinomura | 123/41.08 |
| 2012/0266828 A1* | 10/2012 | Araki et al. | 123/41.08 |

FOREIGN PATENT DOCUMENTS

| | | |
|---|---|---|
| JP | A-2004-293381 | 10/2004 |
| JP | A-2006-161743 | 6/2006 |
| JP | A-2006-342680 | 12/2006 |
| JP | A-2008-8215 | 1/2008 |
| JP | A-2008-169748 | 7/2008 |
| JP | A-2010-180713 | 8/2010 |

\* cited by examiner

VEHICLE AND METHOD FOR CONTROLLING THE SAME

TECHNICAL FIELD

The present invention relates to a vehicle and a method for controlling the vehicle, and more specifically, controlling intermittently stopping an internal combustion engine mounted in a vehicle.

BACKGROUND ART

Most of internal combustion engines mounted in vehicles are cooled with cooling water circulated by a water pump. The water pump is for example an electric-powered and thus driven water pump. The cooling water is used in order to prevent the engine from being extremely heated by the heat generated by the engine's combustion operation. On the other hand, when the engine has low temperature, in other words, when the cooling water's temperature is lower than a predetermined threshold value, the electric-powered water pump is stopped or intermittently stopped to allow the cooling water to be circulated at a limited flow rate to promote warming up the engine for stable combustion operation.

The temperature of the cooling water is not only used for controlling the electric-powered water pump but is also used for controlling the engine in various manners. However, when the water pump is stopped and the cooling water does not circulate, the cooling water at the location of a temperature sensor which measures the temperature of the cooling water and the cooling water at a location distant from the temperature sensor may exhibit a large difference in temperature. Then, the cooling water's temperature sensed by the temperature sensor may no longer reflect the actual temperature of the engine, and the engine may no longer be controlled appropriately.

To address this issue, Japanese Patent Laying-Open No. 2008-169748 (Patent Literature 1) discloses operating an electric-powered water pump for a predetermined period of time if cooling water is lower in temperature than a predetermined threshold value and the electric-powered water pump should be stopped. This can reduce the cooling water's variation in temperature and allows the cooling water's temperature to be understood appropriately.

CITATION LIST

Patent Literature

PTL 1: Japanese Patent Laying-Open No. 2008-169748

SUMMARY OF INVENTION

Technical Problem

The cooling water and the electric-powered water pump can also be used in a hybrid vehicle having an engine and an electric motor mounted therein to cool the engine. Depending on how it travels, the hybrid vehicle may travel only with the driving force received from the electric motor, and in that case, the engine is stopped intermittently. Note, however, that as the engine's startability and combustion stability in restarting the engine is considered, stopping the engine is permitted when the engine's temperature, or the cooling water's temperature is higher than a predetermined reference temperature.

Generally the temperature sensor for sensing the cooling water's temperature is provided at a position distant from the engine's cylinder(s) performing combustion, and, as described above, when the electric-powered water pump circulates the cooling water at a limited flow rate, the cooling water's temperature sensed by the temperature sensor may not reflect the engine's temperature appropriately. In other words, there is a tendency that the temperature sensed by the temperature sensor may be lower than the engine's actual in-cylinder temperature.

Accordingly, when whether the engine may intermittently be stopped is determined from the temperature sensed by the temperature sensor, intermittently stopping the engine may not be permitted as the temperature sensed by the temperature sensor has not reached a reference temperature at which stopping the engine is permitted while in reality the actual in-cylinder temperature has reached the reference temperature. This results in the engine's unnecessarily continued operation and hence poor fuel economy.

Furthermore, rather than a hybrid vehicle, a vehicle having an engine as the only driving source has also the engine intermittently stopped automatically when the vehicle stops waiting for the light to change, i.e., idling stop. Whether to permit stopping such a vehicle's engine may also be determined from the cooling water's temperature, as done for the hybrid vehicle as described above, and a similar problem arises.

Japanese Patent Laying-Open No. 2008-169748 (Patent Literature 1) discloses that in order to render the cooling water's temperature as uniform as possible, the water pump is operated for a predetermined period of time if the temperature of the cooling water is lower than a predetermined threshold value. However, excessively increasing the amount of the cooling water to circulate the cooling water while warming up the engine should be promoted acts to cool the engine on the contrary and may delay warming up the engine.

The present invention has been made to address such an issue and it contemplates a vehicle capable of intermittently stopping an engine, that allows a decision that the engine should be stopped to be appropriately made while the engine's cooling water has a limited flow rate.

Solution to Problem

The present invention provides a vehicle including: an internal combustion engine capable of being intermittently stopped after the internal combustion engine is started; a pump for circulating a cooling medium for cooling the internal combustion engine; and a control device for controlling the internal combustion engine. When the cooling medium has low temperature, the control device controls the pump to limit a flow rate of the cooling medium to be smaller than when the cooling medium has high temperature, and when the cooling medium's flow rate is limited, the control device relaxes a condition applied to permit intermittently stopping the internal combustion engine, as compared with when the cooling medium's flow rate is not limited.

Preferably, the control device relaxes the condition applied to permit intermittently stopping the internal combustion engine when the cooling medium's flow rate is limited and an operation period of time from start of the combustion engine is larger than a reference period of time.

Preferably, the vehicle further includes a temperature detection unit for detecting a temperature of the cooling medium at a position distant from the internal combustion engine.

Preferably, when the cooling medium's flow rate is not limited, the control device permits intermittently stopping the internal combustion engine in response to the cooling medium having exceeded a first threshold value in temperature, whereas when the cooling medium's flow rate is limited, the control device permits intermittently stopping the internal combustion engine in response to the cooling medium having exceeded in temperature a second threshold value lower than the first threshold value.

Preferably, when the cooling medium's flow rate is not limited, the control device permits intermittently stopping the internal combustion engine in response to the cooling medium having exceeded a first threshold value in temperature, whereas when the cooling medium's flow rate is limited, the control device permits intermittently stopping the internal combustion engine in response to the internal combustion engine having an in-cylinder temperature, as estimated from an operational status of the internal combustion engine, having exceeded a second threshold value higher than the first threshold value.

Preferably, the operational status of the internal combustion engine includes at least one of: an amount of air introduced into the internal combustion engine; a rotational speed of the internal combustion engine; and a timing to ignite the internal combustion engine.

Preferably, the vehicle further includes: an electric power storage device; and a rotating electric machine using electric power received from the electric power storage device for generating a driving force for causing the vehicle to travel.

The present invention provides a method for controlling a vehicle including an internal combustion engine capable of being intermittently stopped after the internal combustion engine is started, a pump for circulating a cooling medium for cooling the internal combustion engine, and a control device for controlling the internal combustion engine. The method includes the steps of: controlling the pump to limit a flow rate of the cooling medium when the cooling medium has low temperature to be smaller than when the cooling medium has high temperature; and relaxing a condition applied to permit intermittently stopping the internal combustion engine when the cooling medium's flow rate is limited, as compared with when the cooling medium's flow rate is not limited.

Advantageous Effects of Invention

The present invention can thus provide a vehicle capable of intermittently stopping an engine, that allows a decision that the engine should be stopped to be appropriately made while the engine's cooling water has a limited flow rate.

DESCRIPTION OF EMBODIMENTS

Embodiments of the present invention will be described hereinafter in detail with reference to the drawings. In the figures, identical or corresponding components are identically denoted and will not be described repeatedly in detail.

First Embodiment

Figure 1:
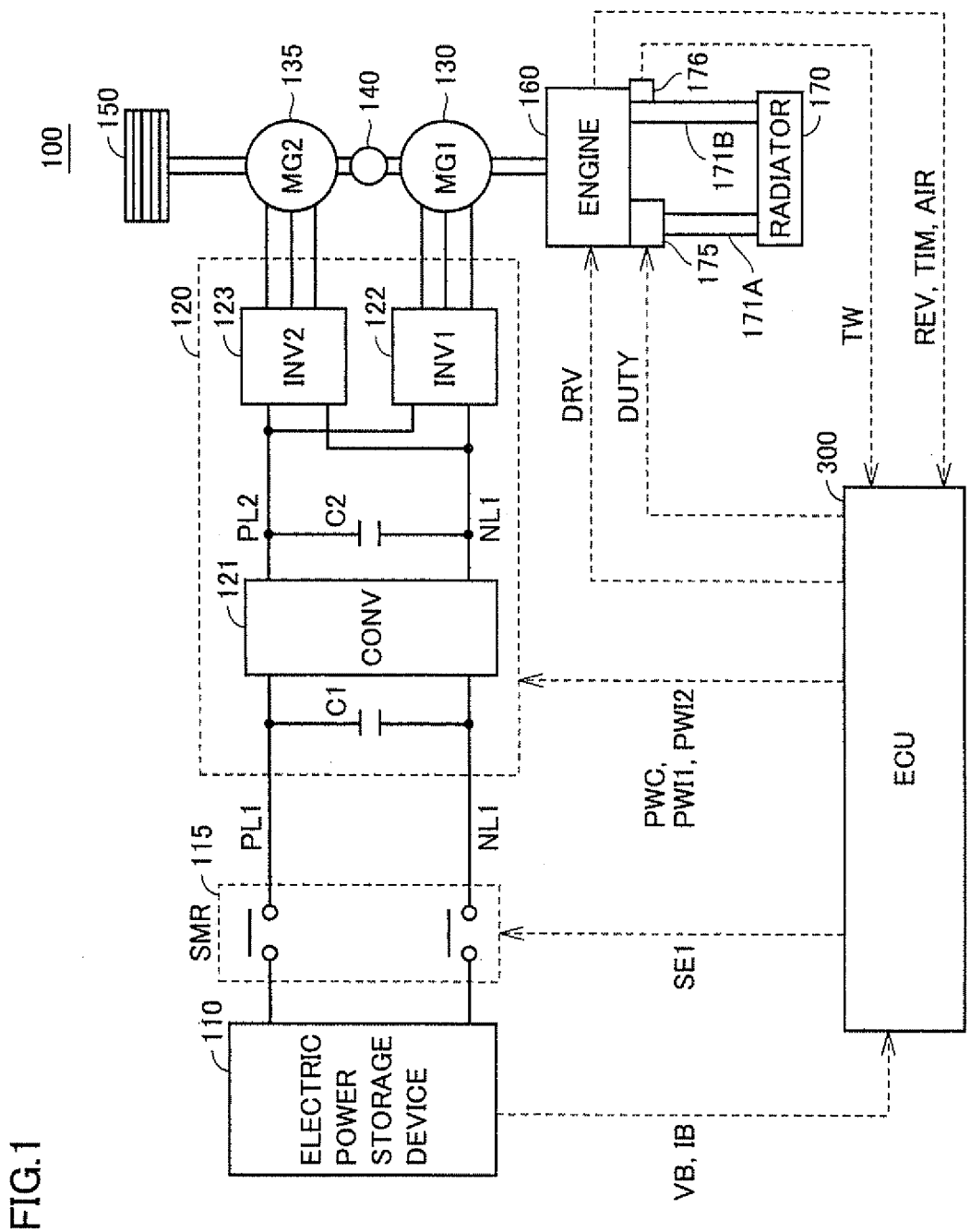
FIG. 1 is a block diagram generally showing a vehicle in accordance with a first embodiment.

FIG. 1 is a block diagram generally showing a vehicle 100 in accordance with a first embodiment. Referring to FIG. 1, vehicle 100 includes an electric power storage device 110, a system main relay (SMR) 115, a PCU (power control unit) 120 that is a drive device, motor generators 130, 135, a driving force transmission gear 140, a driving wheel 150, an engine 160 that is an internal combustion engine, a radiator 170, and an ECU (electronic control unit) 300 that is a control device. Furthermore, PCU 120 includes a converter 121, inverters 122 and 123, and capacitors C1 and C2.

Electric power storage device 110 is a chargeable and dischargeable electric power storage component. Electric power storage device 110 is configured including a lithium ion battery, a nickel metal hydride battery, a lead acid battery or a similar rechargeable battery, or an electric double layer capacitor or a similar electric power storage component, or the like for example.

Electric power storage device 110 is connected to PCU 120 via an electric power line PL1 and a ground line NL1. Electric power storage device 110 supplies electric power to PCU 120 for generating force to drive vehicle 100. Furthermore, electric power storage device 110 stores electric power generated by motor generators 130, 135. Electric power storage device 110 provides an output for example of about 200 V.

SMR 115 includes relays, which are respectively inserted to electric power line PL1 and ground line NL1 connecting electric power storage device 110 and PCU 120. SMR 115 operates in response to a control signal SE1 received from ECU 300 to switch supplying and cutting off electric power between electric power storage device 110 and PCU 120.

Converter 121 operates in response to a control signal PWC received from ECU 300 to perform voltage conversion between electric power and ground lines PL1 and NL1, and electric power and ground lines PL2 and NL1.

Inverters 122, 123 are connected to electric power line PL2 and ground line NL1 in parallel. Inverters 122, 123 operate in response to control signals PWI1, PWI2 received from ECU 300 to covert DC electric power that is supplied from converter 121 into AC electric power to drive motor generators 130, 135, respectively.

Capacitor C1 is provided between electric power line PL1 and ground line NL1 and decreases variation in voltage between electric power line PL1 and ground line NL1. Capacitor C2 is provided between electric power line PL2 and ground line NL1 and decreases variation in voltage between electric power line PL2 and ground line NL1.

Motor generator 130, 135 is an AC rotating electric machine and is a permanent-magnet type synchronous motor including a rotor having a permanent magnet embedded therein for example.

Motor generators 130, 135 output torque which is in turn transmitted to driving wheel 150 via driving force transmission gear 140 configured including a speed reducer, a power split device and/or the like to cause vehicle 100 to travel. When vehicle 100 is regeneratively braked, motor generator 130, 135 can generate electric power by the torque of driving wheel 150. Then, the generated electric power is converted by PCU 120 into electric power to charge electric power storage device 110.

Furthermore, motor generators 130, 135 are also coupled with engine 160 via driving force transmission gear 140. Then, motor generators 130, 135 and engine 160 are cooperatively operated by ECU 300 to generate force required to drive the vehicle. Furthermore, motor generator 130, 135 can be generate electric power by the rotation of engine 160, and this generated electric power can be used to charge electric power storage device 110. In the first embodiment, motor generator 135 is used exclusively as an electric motor for driving driving wheel 150 and motor generator 130 is used exclusively as an electric power generator driven by engine 160 for the sake of illustration.

Note that while FIG. 1 shows a configuration provided with two motor generators as an example, the number of the motor generators is not limited thereto as long as a motor generator which can generate electric power by engine 160 is included, and a single motor generator or two or more motor generators may be provided.

Engine 160 has its rotational speed, valve's opening and closing timing, fuel flow rate and the like controlled by a control signal DRV issued from ECU 300 to generate force to drive vehicle 100 to cause it to travel. Engine 160 is operated and stopped as switched intermittently in accordance with a request for torque determined from the user's accelerator pedal operation, the SOC of electric power storage device 110, and the like.

Engine 160 is coupled to radiator 170 via cooling piping 171A and 171B. Engine 160 is cooled by a cooling medium which circulates through cooling piping 171A and 171B and radiator 170. The cooling medium is representatively cooling water, however, the cooling medium is not limited thereto and may for example be cooling oil or the like. In the following description, cooling water is used as the cooling medium.

The cooling water is circulated through engine 160 (a cylinder head and a cylinder block), cooling piping 171A and 171B, and radiator 170 by water pump 175. Water pump 175 can be an electric-powered water pump, a water pump having a clutch, or the like. Water pump 175 is operable in response to a control signal DUTY issued from ECU 300, as determined based on the cooling water's temperature TW, to adjust the cooling water's flow rate.

Radiator 170 cools the cooling water heated by the heat of engine 160.

The cooling water's temperature TW is sensed by a temperature sensor 176 which is a temperature detection unit provided on the route of the cooling water. Temperature sensor 176 outputs the cooling water's sensed temperature TW to ECU 300.

Although not shown in FIG. 1, ECU 300 includes a CPU (central processing unit), a storage device, and an input/output buffer, and receives a signal from each sensor and outputs a control signal to each device and also controls vehicle 100 and each device. These are controlled not only through a process via software but can also be done by dedicated hardware (or electronic circuitry).

ECU 300 receives the values of voltage VB and current IB sensed by a voltage sensor (not shown) and a current sensor (not shown) provided for electric power storage device 110 and uses the values to compute a state of charge (SOC) of electric power storage device 110.

ECU 300 controls control signal DUTY in accordance with the cooling water's temperature TW indicated by temperature sensor 176 for driving water pump 175. The cooling water is thus circulated at an adjusted flow rate.

ECU 300 receives from engine 160 the information about rotational speed REV of engine 160, a signal TIM indicating a timing of ignition (or an amount of spark retard), and an amount AIR of air introduced. From the information, ECU 300 computes an in-cylinder temperature of engine 160.

Note that while FIG. 1 shows ECU 300 as a single control device, an individual control device may be provided for each function or each device to be controlled, for example such as a control device for PCU 120, or a control device for electric power storage device 110, and the like.

As described above, generally in a vehicle having an engine mounted therein, cooling water is used in order to cool the heat generated as the engine is driven. The cooling water prevents the engine from being excessively heated. On the other hand, if the cooling water removes heat with the engine having low temperature, then it may take longer time to warm up the engine.

When the engine has low temperature, the fuel poorly volatilizes in its cylinder(s), resulting in unstable combustion. Furthermore, for a vehicle with exhaust gas recirculation (EGR) control applied for better fuel economy, when its engine has low temperature, recirculated exhaust gas is unstably combusted, condensation forms in piping for recirculation and water is thus generated therein and may thus corrode the piping. Accordingly, EGR control is generally set so that it may not be performed unless the engine's temperature is equal to or larger than a predetermined temperature.

Accordingly, when the engine has low temperature, the water pump may be controlled to stop the cooling water or limit its flow rate to be smaller than when the engine has high temperature to promote warming up the engine for better fuel economy.

The hybrid vehicle as shown in FIG. 1 may have its engine stopped and thus travel only by a driving force received from a motor generator, depending on a running state of the vehicle and the user operation. The engine may also be stopped when the vehicle is stopped as it waits for the signal for example.

Thus when a vehicle having an engine intermittently stopped, while the vehicle is travelling or stopped, has the engine stopped in an insufficiently warmed-up state (or with the water coolant having a limited flow rate), then, in subsequently starting the engine, the engine provides poor combustibility due to an insufficient warming-up of the engine, resulting in impaired stability of the engine. Accordingly, when the engine is insufficiently warmed up, intermittently stopping the engine may be prohibited to promote warming up the engine.

The temperature of the engine used in determining whether the engine may be intermittently stopped is typically represented by the temperature of cooling water for the engine. However, as described above, if the cooling water has a limited flow rate, the cooling piping for circulating the cooling water may not have uniform temperature distribution and the cooling water's temperature sensed by the temperature sensor may not reflect the engine's temperature appropriately. Typically, the temperature sensor is provided at the cooling piping provided a position distant from the engine (e.g., a cylinder block, a cylinder head, or the like), and when the cooling water has a limited flow rate, the cooling water's temperature sensed by the temperature sensor tends to be lower than that in a vicinity of the cylinder block or the cylinder head or the like. If whether the engine may be intermittently stopped is determined from the cooling water's temperature sensed by the temperature sensor, then, intermittently stopping the engine may be prohibited as the cooling water's temperature sensed is low while in reality the engine's temperature is raised and the engine is sufficiently warmed up. As a result, the engine may be driven unnecessarily, inviting poor fuel economy.

Accordingly, in the first embodiment, intermittently stopping the engine is controlled such that in determining whether the engine may be intermittently stopped, a threshold value set for the cooling water's temperature and applied to permit intermittently stopping the engine is varied between when the cooling water has a limited flow rate and when the cooling water does not have a limited flow rate. When the cooling water has a limited flow rate the engine can nonetheless be intermittently stopped, as appropriately timed, to avoid poor fuel economy.

Figure 2:
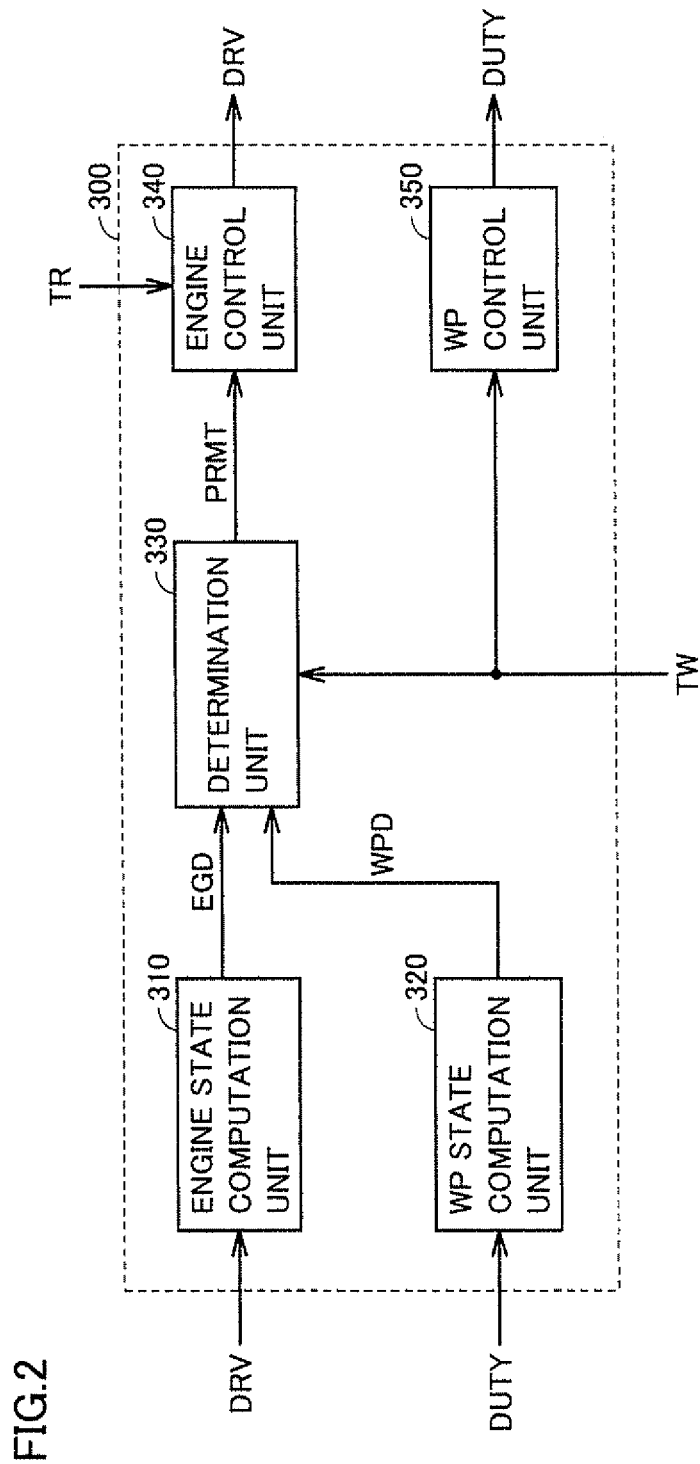
FIG. 2 is a functional block diagram for illustrating how an ECU controls intermittently stopping an engine in the first embodiment.

FIG. 2 is a functional block diagram for illustrating how ECU 300 controls intermittently stopping an engine in the first embodiment. Each functional block shown in FIG. 2 and FIG. 4 described later is implemented by ECU 300 performing a process through software or hardware.

Referring to FIG. 1 and FIG. 2, ECU 300 includes an engine state computation unit 310, a water pump (WP) state computation unit 320, a determination unit 330, an engine control unit 340, and a WP control unit 350.

Engine state computation unit 310 receives a drive signal DRV of engine 160. Based on the information included in drive signal DRV, engine state computation unit 310 computes an operational status of engine 160 including for example whether engine 160 is currently in operation, how long in time engine 160 is driven, and the like. Engine state computation unit 310 outputs a signal EGD for the computed operational status to determination unit 330.

WP state computation unit 320 receives drive signal DUTY of water pump 175. WP state computation unit 320 operates based on drive signal DUTY to compute an operational status of water pump 175 including whether the cooling water has a limited flow rate, how long in time the flow rate is limited, and the like. WP state computation unit 320 outputs a signal WPD for the computed operational status to determination unit 330.

Determination unit 330 receives signal EGD regarding the operational status of engine 160 from engine state computation unit 310, signal WPD regarding the operational status of water pump 175 from WP state computation unit 320, and the cooling water's temperature TW from temperature sensor 176.

From signals EGD and WPD regarding the operational statuses of engine 160 and water pump 175, determination unit 330 determines a threshold value γ for the cooling water's temperature TW for determining whether to intermittently stop engine 160. Furthermore, determination unit 330 compares the cooling water's temperature TW with the determined threshold value γ to determine whether to permit intermittently stopping engine 160. Then, determination unit 330 outputs a permission signal PRMT indicating a resultant determination to engine control unit 340. Specifically, for example, when intermittently stopping engine 160 is permitted, permission signal PRMT is set on, whereas when intermittently stopping engine 160 is prohibited, permission signal PRMT is set off.

Engine control unit 340 receives a torque command TR determined from the user's operation or the like, generates drive signal DRV for driving engine 160, and outputs it to engine 160.

Furthermore, engine control unit 340 receives permission signal PRMT from determination unit 330 for intermittently stopping the engine. When engine control unit 340 receives from determination unit 330 permission signal PRMT set on, then engine control unit 340 stops engine 160 in response to other conditions having been established for stopping engine 160. When engine control unit 340 receives from determination unit 330 permission signal PRMT set off, then engine control unit 340 continues to drive engine 160 even if the other conditions have been established for stopping engine 160.

WP control unit 350 receives the cooling water's temperature TW from temperature sensor 176. WP control unit 350 generates drive signal DUTY for driving water pump 175, based on the cooling water's temperature TW, to control the flow rate of the cooling water. For example, WP control unit 350 sets drive signal DUTY to limit the flow rate of the cooling water if the cooling water's temperature TW is lower than a predetermined reference temperature TWA. Note that limiting the flow rate of the cooling water includes stopping water pump 175. Reference temperature TWA is not limited to a specific fixed temperature, and for example it is also set variably, based on the operational state of engine 160 or to have hysteresis.

Figure 3:
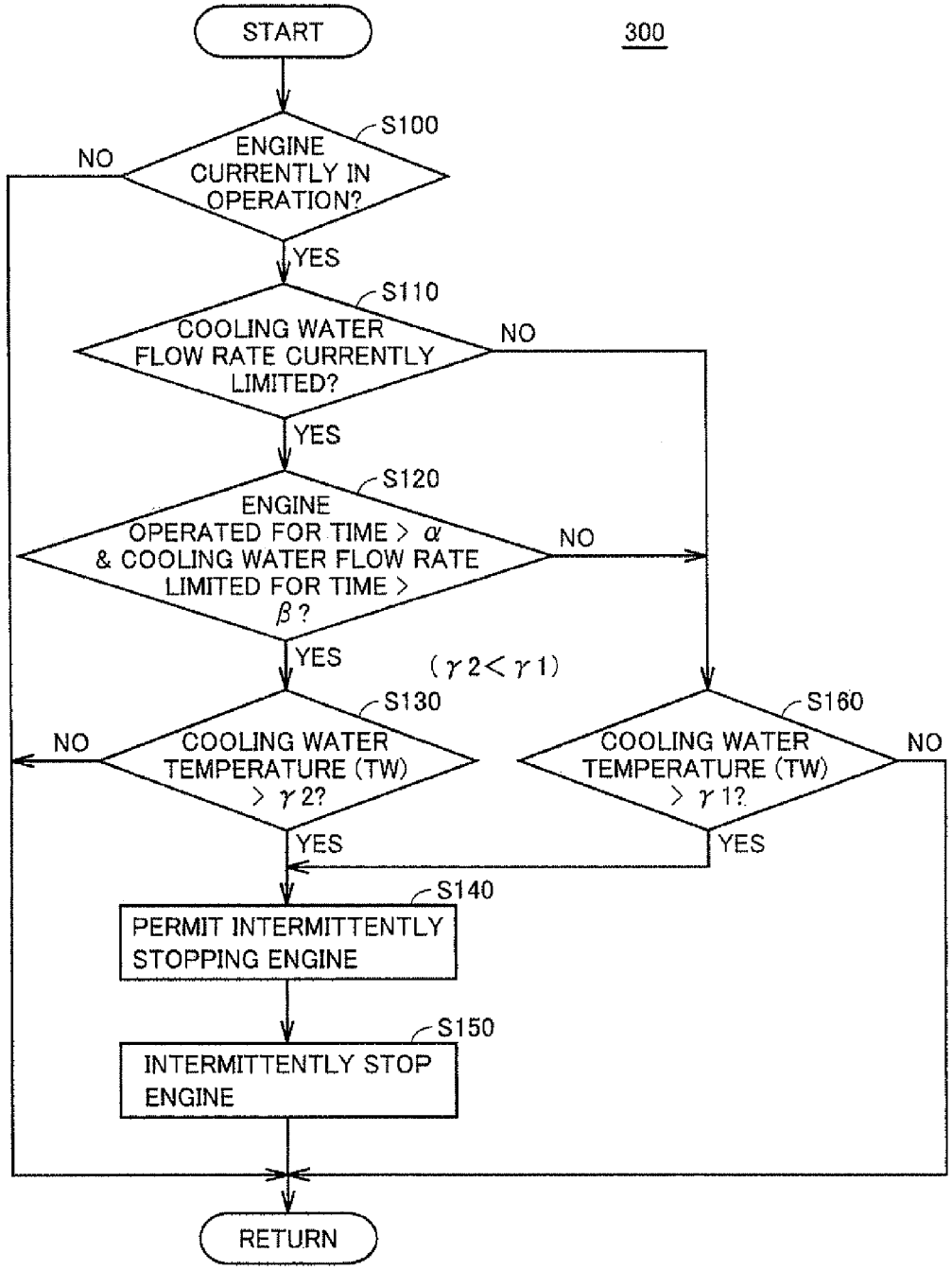
FIG. 3 is a flowchart for specifically illustrating a process performed by the ECU to control intermittently stopping an engine in the first embodiment.

FIG. 3 is a flowchart for specifically illustrating a process performed by ECU 300 to control intermittently stopping an engine in the first embodiment. The flowcharts shown in FIG. 3 and FIG. 5 described later represent processes implemented by calling a program that is previously stored in ECU 300 from a main routine and periodically executing the program. Alternatively, the steps can partially or entirely be implemented by dedicated hardware (or electronic circuitry).

With reference to FIG. 1 and FIG. 3, ECU 300 in step (hereinafter, abbreviated as "S") 100 determines whether engine 160 is currently in operation. This decision is made from a drive command DRV currently received from engine control unit 340 of FIG. 2, for example.

If engine 160 is stopped (NO at S100), the process is returned to the main routine.

If engine 160 is in operation (YES at S100), the control proceeds to S110 and ECU 300 determines whether the cooling water has a flow rate limited by water pump 175. This decision is made from drive signal DUTY of water pump 175, for example.

If the cooling water does not have a limited flow rate (NO at S110), in other words, if the cooling water's temperature TW is higher than reference temperature TWA, the control proceeds to S160 and ECU 300 determines whether the cooling water's temperature TW is higher than a predetermined threshold value γ1 (for example of 40 degrees centigrade) (γ1>TWA).

If the cooling water's temperature TW is larger than threshold value γ (YES at S160), ECU 300 determines that engine 160 has sufficiently high temperature so that if engine 160 is intermittently stopped, engine 160 can subsequently be restarted without impaired startability. Then, ECU 300 proceeds to S140 to permit intermittently stopping engine 160 and set permission signal PRMT to on. Then, at S150, ECU 300 intermittently stops engine 160 in response to other conditions having been established.

If the cooling water's temperature TW is equal to or smaller than threshold value γ1 (NO at S160), intermittently stopping engine 160 may impair the startability of engine 160 in subsequently restarting engine 160, and accordingly, ECU 300 continues to operate engine 160 and returns to the main routine. Note that although not shown, at the time, permission signal PRMT is set to off.

In contrast, for YES at S110, i.e., if the cooling water has a limited flow rate, the control proceeds to S120. Then, based on how long in time engine 160 is in operation and how long in time the cooling water has a limited flow rate, ECU 300 determines whether or not the cooling water's temperature TW received from temperature sensor 176 reflects the temperature of engine 160 appropriately.

Specifically, ECU 300 determines whether or not engine 160 is in operation for a period of time larger than a threshold value α (for example of 60 seconds) and whether or not the cooling water has a limited flow rate for a period of time larger than a threshold value β (for example of 60 seconds).

If the period of operation time of engine 160 is larger than threshold value α and the time period of limitation of the flow rate is larger than threshold value β (YES at S120), it means that engine 160 is sufficiently warmed up and the cooling water has a limited flow rate continuously for a long period of time. Accordingly, ECU 300 determines that there is a possibility that a deviation has arisen between the cooling water's temperature in a vicinity inside a cylinder of engine 160 and that in a vicinity of temperature sensor 176 and the cooling water's temperature TW received from temperature sensor 176 may not reflect the temperature of engine 160 appropriately.

Then, ECU 300 proceeds with the process to S130 to set the threshold value that permits intermittently stopping engine 160 at a threshold value γ2 (for example of 30 degrees centigrade) lower than threshold value γ1 used at S160 (i.e., γ1>γ2). Then, ECU 300 determines whether the cooling water's temperature TW received from temperature sensor 176 is larger than threshold value γ2.

Herein, threshold value γ2 is previously determined through an experiment or the like based on the cooling water's unevenness in temperature as observed when the condition at S120 is established. Furthermore, threshold value γ2 may be a specific single value or set variably using a map or the like based on a difference between a period of time in operation of engine 160 and threshold value α, and a difference between a period of time in which the flow rate of the cooling water is limited and threshold value β.

If the cooling water's temperature TW is larger than threshold value γ2 (YES at S130), ECU 300 proceeds with the process to S140 to permit intermittently stopping engine 160. Then, in S150, ECU 300 intermittently stops engine 160 in response to other conditions having been established.

If the cooling water's temperature TW is equal to or smaller than threshold value γ2 (NO at S130), ECU 300 continues to operate engine 160 and returns to the main routine.

By performing control in accordance with the above process, in a vehicle capable of intermittently stopping its engine, the intermittently stopping of the engine is allowed at an appropriate timing based on the temperature of the cooling water, even in the case where the cooling water of the engine has a limited flow rate. This prevents the engine's unnecessarily continuous operation caused by a delayed timing of permitting the intermittently stopping of the engine, and hence impaired fuel economy.

Furthermore, in making a decision when the cooling water has a limited flow rate, reflecting how long in time the engine is in operation can prevent the engine from being intermittently stopped inappropriately when it is in an insufficiently warmed-up, cold state.

Note that the first embodiment has been described for a hybrid vehicle equipped with an engine and a motor generator as an example. However, controlling an engine to intermittently stop it, as described above, is also applicable to a vehicle of a conventional type equipped with an engine alone that stops the engine when the vehicle stops, i.e., a vehicle having a function of idling stop.

Second Embodiment

The first embodiment has been described for a configuration in which when the cooling water has a limited flow rate, a threshold value for the cooling water's temperature applied to permit intermittently stopping the engine is decreased to be lower than when the cooling water does not have a limited flow rate, so that intermittently stopping the engine is appropriately permitted, if the cooling water has a limited flow rate and is thus not uniform in temperature.

In the first embodiment, when the cooling water has a limited flow rate, a threshold value for the cooling water's temperature applied to permit intermittently stopping the engine is varied. Meanwhile, in a second embodiment, a configuration will be described in which whether to permit intermittently stopping the engine is determined based on an estimated temperature in a cylinder of the engine, as computed based on the engine's operational status.

Figure 4:
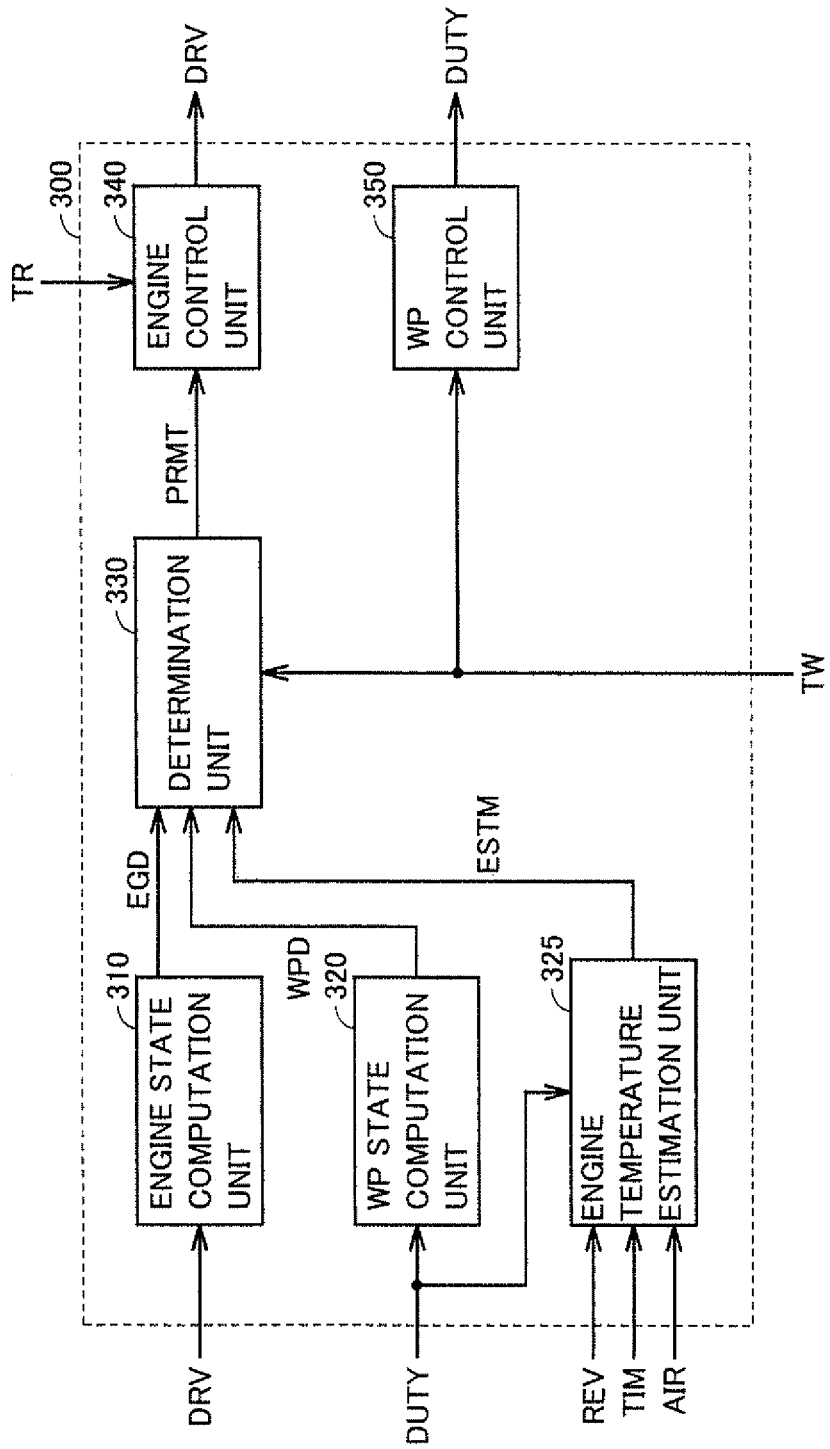
FIG. 4 is a functional block diagram for illustrating how an ECU controls intermittently stopping an engine in a second embodiment.

FIG. 4 is a functional block diagram for illustrating how ECU 300 controls intermittently stopping an engine in the second embodiment. FIG. 4 corresponds to the FIG. 2 functional block diagram plus an engine temperature estimation unit 325. Those components in FIG. 4 which overlap FIG. 2 will not be described repeatedly. With reference to FIG. 1 and FIG. 4, engine temperature estimation unit 325 receives from engine 160 the information about rotational speed REV of engine 160, signal TIM indicating a timing of ignition (or an amount of spark retard), and amount AIR of air introduced. Furthermore, engine temperature estimation unit 325 receives drive signal DUTY of water pump 175. Based on the information, engine temperature estimation unit 325 computes an amount of an in-cylinder temperature increased by combustion of engine 160 in a period of time determined as based on a control period. Note that in the combustion, the radiation of heat from the body of engine 160 and the cooling by the cooling water are taken into consideration. Then, engine temperature estimation unit 325 accumulates the increased amount of the in-cylinder temperature along the time axis to estimate the current in-cylinder temperature ESTM of engine 160. Engine temperature estimation unit 325 outputs the estimated in-cylinder temperature value ESTM to determination unit 330.

Determination unit 330 receives signal EGD regarding the operational status of engine 160 from engine state computation unit 310, signal WPD regarding the operational status of water pump 175 from WP state computation unit 320, and the cooling water's temperature TW from temperature sensor 176. Furthermore, determination unit 330 receives the estimated in-cylinder temperature value ESTM from engine temperature estimation unit 325.

Based on signal WPD regarding the operational status of water pump 175, determination unit 330 determines whether or not the cooling water has a limited flow rate. If the cooling water does not have a limited flow rate, then, determination unit 330 compares the cooling water's temperature TW with threshold value γ1 to determine whether to intermittently stop engine 160, as has been done in the first embodiment.

Meanwhile, if the cooling water has a limited flow rate, determination unit 330 compares the estimated in-cylinder temperature value ESTM with a predetermined threshold value δ to determine whether to intermittently stop engine 160. Then, determination unit 330 outputs permission signal PRMT indicating a resultant determination to engine control unit 340. Specifically, for example, when intermittently stopping engine 160 is permitted, permission signal PRMT is set to on, whereas when intermittently stopping engine 160 is prohibited, permission signal PRMT is set to off.

Figure 5:
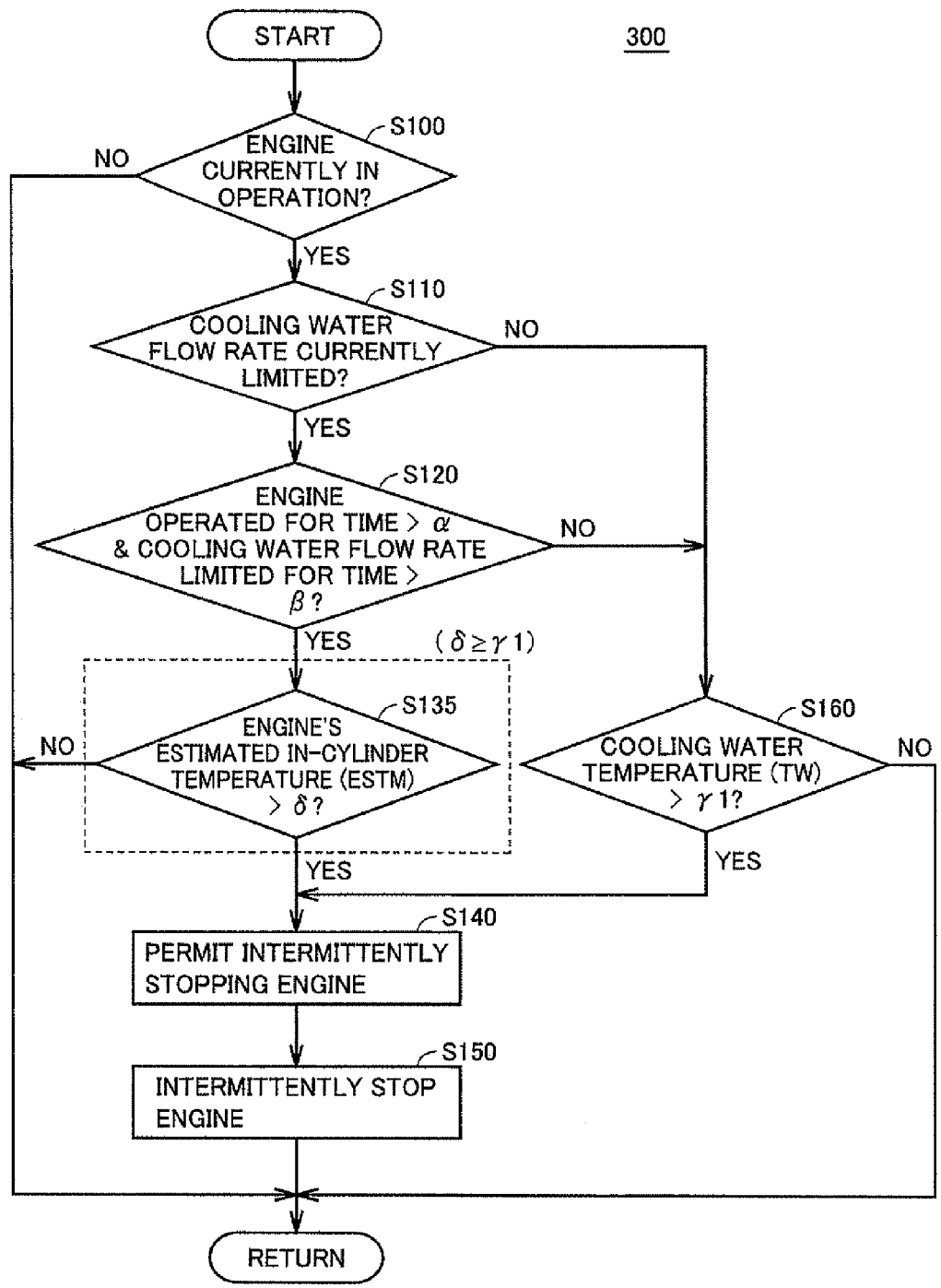
FIG. 5 is a flowchart for illustrating a process performed by the ECU to control intermittently stopping an engine in the second embodiment.

FIG. 5 is a flowchart for specifically illustrating a process performed by ECU 300 to control intermittently stopping an engine in the second embodiment. FIG. 5 corresponds to the flowchart of FIG. 3 described in the first embodiment, with Step S130 replaced with Step S135. Those components in FIG. 5 which overlap FIG. 3 will not be described repeatedly.

With reference to FIG. 1 and FIG. 5, if engine 160 is in operation (YES at S100) and the cooling water has a limited flow rate (YES at S110), ECU 300 at S120 determines whether or not engine 160 is in operation for a period of time larger than threshold value α and whether the cooling water has a limited flow rate for a period of time larger than threshold value β.

If engine 160 is in operation for a period of time larger than threshold value α and the cooling water has a limited flow rate for a period of time larger than threshold value β (YES at S120), the process proceeds to S135. At S135, ECU 300 estimates in-cylinder temperature ESTM of engine 160 based on rotational speed REV of engine 160, signal TIM indicating a timing of ignition (or an amount of spark retard), amount AIR of air introduced, and the like. Then, ECU 300 determines whether or not the estimated in-cylinder temperature value ESTM is larger than predetermined threshold value δ (δγ1).

If the estimated in-cylinder temperature value ESTM is larger than predetermined threshold value δ (YES at S135), ECU 300 determines that engine 160 is sufficiently warmed up. Then, ECU 300 permits intermittently stopping engine 160 (S140), and intermittently stops engine 160 in response to other conditions having been established (S150).

If the estimated in-cylinder temperature value ESTM is equal to or smaller than predetermined threshold value δ (NO at S135), ECU 300 determines that engine 160 is insufficiently warmed up, and ECU 300 returns to the main routine.

By performing control in accordance with the above process, in a vehicle capable of intermittently stopping its engine, the intermittently stopping of the engine is allowed at an appropriate timing based on the temperature of the cooling water, even in the case where the cooling water of the engine has a limited flow rate.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST

100: vehicle; 110: electric power storage device; 115: SMR; 120: PCU; 121: converter; 122, 123: inverter; 130, 135: motor generator; 140: driving force transmission gear; 150: driving wheel; 160: engine; 170: radiator; 171A, 171B: cooling piping; 175: water pump; 176: temperature sensor; 300: ECU; 310: engine state computation unit; 320: WP state computation unit; 325: engine temperature estimation unit; 330: determination unit; 340: engine control unit; 350: WP control unit; C1, C2: capacitor; NL1: ground line; PL1, PL2: electric power line.

The invention claimed is:

1. A vehicle comprising:
    an internal combustion engine configured to be intermittently stopped after said internal combustion engine is started;
    a pump for circulating a cooling medium for cooling said internal combustion engine; and
    a control device for controlling said internal combustion engine,
    wherein, when said cooling medium has a low temperature, said control device controls said pump to limit a flow rate of said cooling medium so that it is smaller than when said cooling medium has a high temperature, and
    when said flow rate of said cooling medium is limited, said control device relaxes a condition associated with a temperature of said internal combustion engine so as to permit intermittently stopping said internal combustion engine; as compared with when said flow rate is not limited.

2. The vehicle according to claim 1, wherein said control device relaxes said condition when (i) said flow rate is limited and (ii) an operation period of time, calculated from the start of said internal combustion engine, is larger than a reference period of time.

3. The vehicle according to claim 2, further comprising comprising:
    a temperature detection unit provided at a cooling piping that is coupled with said internal combustion engine; and
    a radiator for cooling said cooling medium and for detecting a temperature of said cooling medium.

4. The vehicle according to claim 3, further comprising:
    an electric power storage device; and
    a rotating electric machine that uses electric power received from said electric power storage device for generating a driving force that causes the vehicle to travel.

5. The vehicle according to claim 2, wherein when said flow rate is not limited, said control device permits intermittently stopping said internal combustion engine when said cooling medium exceeds a first threshold value in temperature, and
    when said flow rate is limited, said control device permits intermittently stopping said internal combustion engine when said cooling medium exceeds a second threshold value in temperature, said second threshold value being lower than said first threshold value.

6. The vehicle according to claim 5, further comprising:
    an electric power storage device; and
    a rotating electric machine that uses electric power received from said electric power storage device for generating a driving force that causes the vehicle to travel.

7. The vehicle according to claim 2, wherein when said flow rate is not limited, said control device permits intermittently stopping said internal combustion engine in response when said cooling medium exceeds a first threshold value in temperature, and
    when said flow rate is limited, said control device permits intermittently stopping said internal combustion engine when an in-cylinder temperature of said internal combustion engine exceeds a second threshold value,
        said in-cylinder temperature of said internal combustion engine being estimated from an operational status of said internal combustion engine, and
        said second threshold value being higher than said first threshold value.

8. The vehicle according to claim 7, wherein said operational status of said internal combustion engine includes at least one of: an amount of air introduced into said internal combustion engine; a rotational speed of said internal combustion engine; and a timing to ignite said internal combustion engine.

9. The vehicle according to claim 8, further comprising:
    an electric power storage device; and a rotating electric machine that uses electric power received from said electric power storage device for generating a driving force that causes the vehicle to travel.

10. The vehicle according to claim 7, further comprising:
an electric power storage device; and
a rotating electric machine that uses electric power received from said electric power storage device for generating a driving force that causes the vehicle to travel.

11. The vehicle according to claim 2, further comprising:
an electric power storage device; and
a rotating electric machine that uses electric power received from said electric power storage device for generating a driving force that causes the vehicle to travel.

12. The vehicle according to claim 1, further comprising:
an electric power storage device; and
a rotating electric machine that uses electric power received from said electric power storage device for generating a driving force that causes the vehicle to travel.

13. A method for controlling a vehicle,
the vehicle comprising:
an internal combustion engine configured to be intermittently stopped after said internal combustion engine is started,
a pump for circulating a cooling medium for cooling said internal combustion engine, and
a control device for controlling said internal combustion engine,
the method comprising the steps of:
controlling said pump to limit a flow rate of said cooling medium when said cooling medium has a low temperature so that said flow rate is smaller than when said cooling medium has a high temperature; and
relaxing a condition associated with a temperature of said internal combustion engine when said flow rate is limited so as to permit intermittently stopping said internal combustion engine, as compared with when said flow rate is not limited.

14. A vehicle comprising:
an internal combustion engine configured to be intermittently stopped after said internal combustion engine is started;
a pump for circulating a cooling medium for cooling said internal combustion engine; and
a control device for controlling said internal combustion engine,
wherein, when said control device controls said pump to limit a flow rate of said cooling medium and when said cooling medium has a temperature higher than a threshold value $\gamma 2$, said control device permits intermittently stopping said internal combustion engine, and
when said control device controls said pump to limit a flow rate of said cooling medium and when said cooling medium has a temperature equal to or smaller than said threshold value $\gamma 2$, said control device does not permit intermittently stopping said internal combustion engine.

15. The vehicle according to claim 14, wherein said threshold value $\gamma 2$ is determined based on how long said internal combustion engine has been in an on position and how long said pump has limited said flow rate of said cooling medium.

16. The vehicle according to claim 14, wherein when said control device does not control said pump to limit said flow rate of said cooling medium and said cooling medium has a temperature higher than a threshold value $\gamma 1$, said control device permits intermittently stopping said internal combustion engine, and
when said control device does not control said pump to limit said flow rate of said cooling medium and said cooling medium has a temperature equal to or smaller than said threshold value $\gamma 1$, said control device does not permit intermittently stopping said internal combustion engine.

17. The vehicle according to claim 16, wherein said threshold value $\gamma 1$ is greater than said threshold value $\gamma 2$.

18. A method of controlling intermittently stopping an internal combustion engine, the method comprising:
permitting intermittently stopping said internal combustion engine when a flow rate of a cooling medium is limited and when said cooling medium has a temperature higher than a threshold value $\gamma 2$; and
not permitting intermittently stopping said internal combustion engine when said flow rate of said cooling medium is limited and when said cooling medium has a temperature equal to or smaller than said threshold value $\gamma 2$.

19. The method according to claim 18, wherein said threshold value $\gamma 2$ is determined based on how long said internal combustion engine has been in an on position and how long said flow rate of said cooling medium has been limited.

20. The method according to claim 18, further comprising:
permitting intermittently stopping said internal combustion engine when said flow rate of said cooling medium is not limited and said cooling medium has a temperature higher than a threshold value $\gamma 1$; and
not permitting intermittently stopping said internal combustion engine when said flow rate of said cooling medium is not limited and said cooling medium has a temperature equal to or smaller than said threshold value $\gamma 1$.

21. The method according to claim 20, wherein said threshold value $\gamma 1$ is greater than said threshold value $\gamma 2$.

* * * * *